United States Patent [19]

Kafer et al.

[11] Patent Number: 4,914,506
[45] Date of Patent: Apr. 3, 1990

[54] COMPONENT COLOR BAR ALIGNMENT TEST SIGNAL

[75] Inventors: Warren G. Kafer; Bruce J. Penney, both of Portland, Oreg.

[73] Assignee: Tektronix, Inc., Beaverton, Oregon

[21] Appl. No.: 342,773

[22] Filed: Apr. 24, 1989

[51] Int. Cl.⁴ .............................................. H04N 17/04
[52] U.S. Cl. ........................................ 358/10; 358/139
[58] Field of Search ...................... 358/10, 139, 28, 27

[56] References Cited

U.S. PATENT DOCUMENTS

| | | | |
|---|---|---|---|
| 4,091,411 | 5/1978 | Sanada et al. | 358/28 |
| 4,101,928 | 7/1978 | Sato et al. | 358/10 |
| 4,207,589 | 6/1980 | Kawasaki | 358/28 |

Primary Examiner—Howard W. Britton
Assistant Examiner—Tommy D. Lee
Attorney, Agent, or Firm—Francis I. Gray

[57] ABSTRACT

A component color bars alignment test signal for calibrating a component picture monitor having as inputs a luminance component and two orthogonal chrominance components has a standard set of color bars and a contiguous chroma set of color bars. The chroma set of color bars is matched to the standard set so that a color that is sensitive to the adjustment of one of the chrominance components is adjacent to a color that is relatively insensitive to the adjustment of that one chrominance component. A gun of the component picture monitor is turned off and one chrominance component is adjusted until the appropriate pair of standard set and chroma set color bars are indistinguishable.

7 Claims, 2 Drawing Sheets

COMPONENT COLOR BAR ALIGNMENT TEST SIGNAL

BACKGROUND OF THE INVENTION

The present invention relates to test signal generators, and more particularly to a component color bar alignment test signal applicable for aligning color component signals defined in Cartesian coordinates.

In calibrating a television system a picture monitor is used to subjectively observe signal quality. Therefore a first step in system calibration is to calibrate the picture monitor. To calibrate the picture monitor a test signal is inserted into the picture monitor and the chroma phase and gain are adjusted to achieve a desired appearance. For an NTSC picture monitor the test signal usually used is a SMPTE color bar test signal having a sequence of white, yellow, cyan, green, magenta, red, blue and black colors in the form of vertical bars of color. Below the color bars is a color set bar portion that matches different colors to the vertical color bars. For the NTSC composite video system a reverse blue bars is used as the color set bar portion so that bars containing blue alternate with black bars. To calibrate the picture monitor the red and green guns of the monitor are turned off. Chroma gain is adjusted to match the brightness of the color set bar portion just below the outer left or right blue bar. For chroma phase the brightness of either center main blue bar is adjusted to match the chroma set blue just below. For PAL systems chroma gain is calibrated in a similar manner, while small errors can be ignored since they can be removed in a full PAL decoder.

The conventional full field color bar alignment test signal for component video is designed to check GBR path gains in the picture monitor. This is a color primary system. However current monitors and component systems may use a luminance and color difference signals instead of GBR, namely Y, R-Y and B-Y or Y, Pb, Pr where Pb and Pr are normalized versions of B-Y and R-Y, respectively. The Pb and Pr chroma components define the color in orthogonal, or Cartesian, coordinates rather than polar coordinates. These new monitors have an internal matrix that converts the Y, Pb, Pr into GBR for the display, but current test signals do not provide a signal that is sensitive to gain adjustments in Cartesian coordinates.

What is desired is a test signal and calibration method for aligning a component picture monitor having Y, Pb and Pr as the component inputs.

SUMMARY OF THE INVENTION

Accordingly the present invention provides a component color bars alignment test signal for calibrating a picture monitor having Y, Pb and Pr as inputs. The test signal has a standard set of color bars and a contiguous chroma set of color bars. The chroma set of color bars is matched to the standard set such that colors affected greatly by changes in one of the chroma components are adjacent to colors that have a negative or weak sensitivity to that chroma component. Turning off the green gun of the picture monitor allows the Pb and Pr gains to be adjusted for a match of the appropriate color pairs for a simple calibration procedure. Alternatively another portion of the test signal allows adjustment of the Pb gain by also turning off the red gun with the green gun, and of the Pr gain by also turning off the blue gun with the green gun.

The objects, advantages and other novel features of the present invention are apparent from the following detailed description when read in conjunction with the appended claims and attached drawing.

DESCRIPTION OF THE PREFERRED EMBODIMENT

Figure 1:
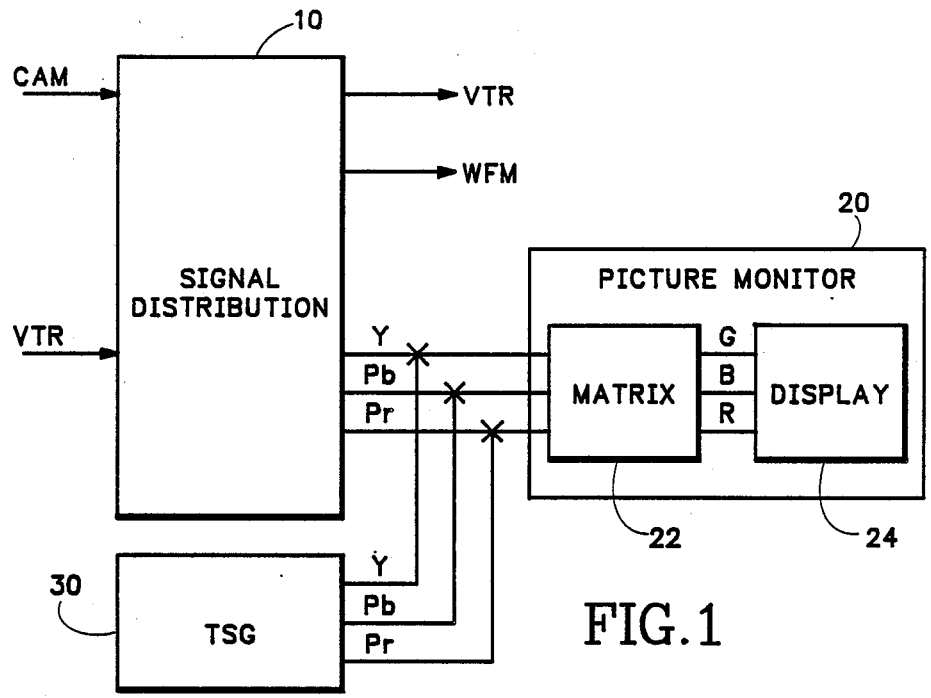
FIG. 1 is a simplified block diagram of a television system including a test signal generator for calibrating a picture monitor according to the present invention.
Figure 2:
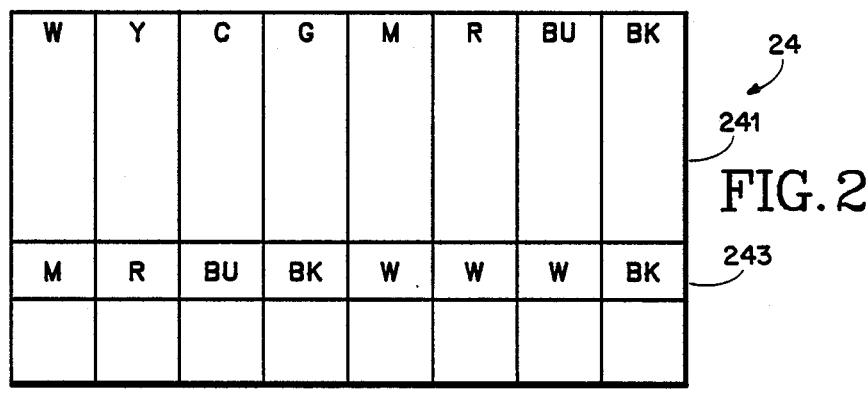
FIG. 2 is an illustration of a component color bar alignment test signal according to the present invention.

Referring now to FIG. 1 a television system has many video sources, such as cameras, video tape recorders or the like, that are input to a signal distribution matrix or router 10. The signals are routed to other video tape recorders, to test and measurement equipment, such as a waveform monitor, and to a picture monitor 20. The inputs to the picture monitor 20 are in the form of component video signals having a luminance component and two orthogonal chrominance components, such as YIQ; YUV; Y, B-Y, R-Y; Y, Pb, Pr; or the like. A test signal generator 30, having a programmable read only memory (PROM) in which a test signal is embedded, is connected to provide the test signal to the picture monitor 20. The picture monitor 20 has a matrix 22 to convert the component inputs to GBR to drive a display 24 upon which the resulting video image is shown. The formula for the conversion from orthogonal color difference components to GBR color components is determined by the phosphors of the GBR display 24 and the system component standard being used.

Figure 3:
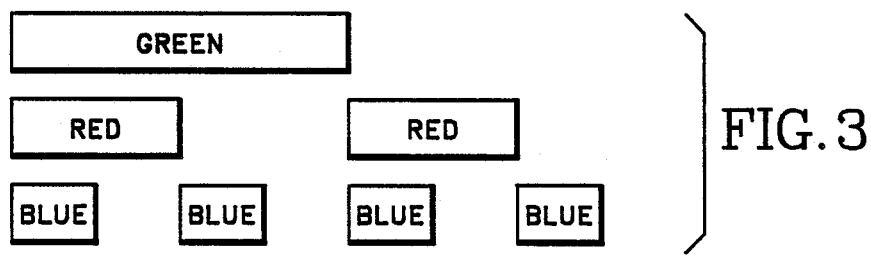
FIG. 3 is a graphical illustration of the GBR components required for each color bar of a standard set of color bars within the test signal shown in FIG. 2.

The test signal has a main color bars section 241 having vertical color bars of white, yellow, cyan, green, magenta, red, blue and black, the standard color bar sequence. The test signal also has a chroma set color bars portion 243 that is specially matched to the standard color bars to produce pairs of matched colors that are suitable for adjusting the gain of orthogonally defined chrominance components. Since yellow is a combination of red and green with a high luminance value, FIG. 3 showing the primaries for the main color bars 241, it has a slight sensitivity to R-Y gain while red has a great sensitivity to R-Y gain. So in the chroma set color bars portion 243 red is matched with yellow. Likewise blue is matched with cyan for B-Y sensitivity. Magenta and white are matched since both are functions of red and blue, and black is matched with green since neither is a function of blue or red. White also is matched with the red and blue main color bars, and black is matched to black to complete the chroma set color bars portion 243.

Now calibration is achieved in either one of two manners. A simple calibration is achieved by turning off just the green gun of the picture monitor display 24. This leaves only the red component of yellow and the blue component of cyan in the main color bars which are in turn matched with red and blue, respectively.

Adjusting the gain for the Pr component until the reds match, and adjusting the gain for the Pb component until the blues match, results in the calibration of the Pr and Pb gains, relative to luminance gain, for the monitor 20. Alternatively turning off either the red or blue guns together with the green gun results in the white that is matched with the red and blue main color bars becoming red or blue, respectively. Again adjusting the appropriate Pb or Pr gain for color match results in calibration of the monitor 20.

Figure 4:
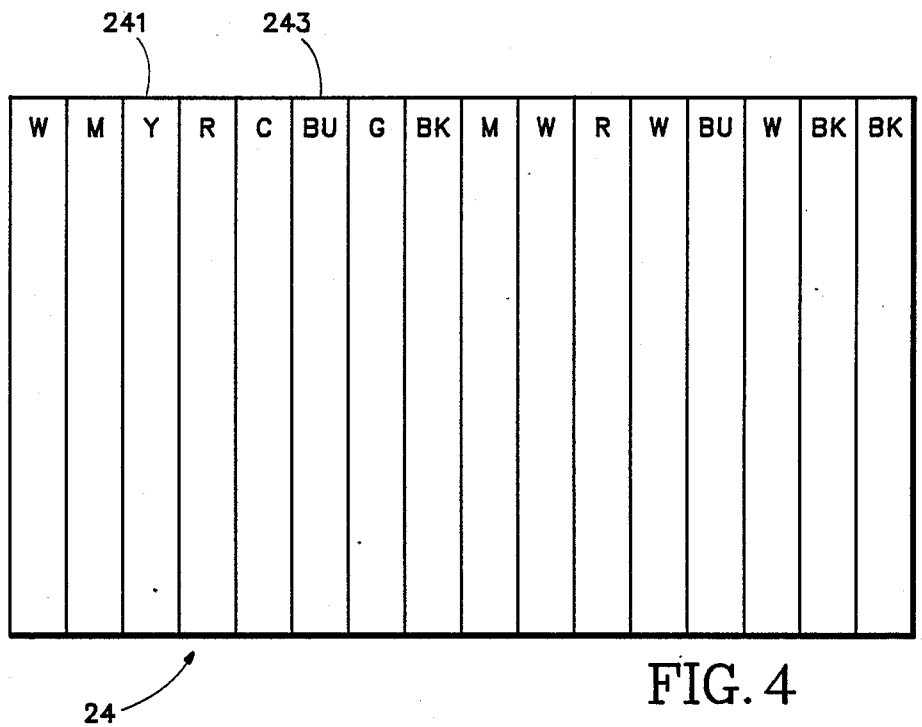
FIG. 4 is an alternative illustration of a component color bar alignment test signal according to the present invention.

Although the main color bars and chroma set color bars are indicated as being one above the other, they also could be set to be side by side in the form of parallel vertical bars as shown in FIG. 4. The significant feature is the selection of a color that one chroma component affects significantly to be next to another color that is not appreciably affected or is negatively affected by that chroma component. These matching colors lie approximately along the respective axes of the orthogonal coordinate system used to define the chrominance components. Also other colors than the SMPTE color bars may be used as the main color bars 241 so long as the chroma set color bars 243 meet the sensitivity matching criteria with the main color bars.

Thus the present invention provides a test signal and method for calibrating a picture monitor where the component inputs have a luminance component and orthogonal chrominance components. The test signal matches a color that is very sensitive to one of the chroma components with a color that is relatively unaffected by that chroma component; and calibration is achieved by displaying the test signal, turning off the appropriate color gun or guns of the picture monitor, and adjusting the appropriate chroma component gain to achieve a match.

What is claimed is:

1. A test signal for calibrating a component picture monitor having as component inputs a luminance component and two orthogonal chrominance components comprising:

a main color bars portion that presents a first set of color bars for display; and a chroma set color bars portion having a second set of color bars contiguous each to one of the first color bars, the chroma set color bars being matched to the first color bars such that a color that is sensitive to the adjustment of one of the chrominance components is contiguous to a color that is relatively insensitive to the adjustment of that chrominance component.

2. A test signal as recited in claim 1 wherein the first set of color bars comprises a plurality of vertical colors in the horizontal sequence of white, yellow, cyan, green, magenta, red, blue and black, and the second set of color bars comprises a plurality of vertical colors contiguous to the bottom of each of the first set in the horizontal sequence of magenta, red, blue, black, white, white, white and black.

3. A test signal as recited in claim 1 wherein the first set of color bars and the chroma set of color bars are interleaved as a plurality of vertical color bars in the horizontal sequence of white, magenta, yellow, red, cyan, blue, green, black, magenta, white, red, white, blue, white, black and black.

4. A test signal as recited in claim 1 wherein the chroma set color bars are matched to the first color bars such that a color that is sensitive to the adjustment of one of the chrominance components is contiguous to a color that is negatively insensitive to the adjustment of that chrominance component.

5. A method of calibrating a component picture monitor having as component inputs a luminance component and two orthogonal chrominance components comprises the steps of:

displaying a test signal having a first set of color bars and a chroma set of color bars contiguous to the first set, the chroma set of color bars being matched to the first set of color bars so that a color that is sensitive to the adjustment of one of the chrominance components is contiguous to a color that is relatively insensitive to the adjustment of that chrominance component;

turning off a color gun of the component picture monitor according to the chrominance component to be adjusted; and adjusting the chrominance component until an appropriate pair of color bars from the first set and the chroma set are indistinguishable.

6. A method as recited in claim 5 further comprises the step of adjusting the other chrominance component until another appropriate pair of color bars from the first set and the chroma set are indistinguishable.

7. A method as recited in claim 5 wherein the chroma set of color bars is matched to the first set of color bars so that a color that is sensitive to the adjustment of one of the chrominance components is contiguous to a color that is negatively insensitive to the adjustment of that chrominance component.

* * * * *